Aug. 15, 1967 H. HEYMANN 3,336,579
TESTING APPARATUS FOR INFORMATION STORAGE DEVICES
OF DATA PROCESSING SYSTEMS
Filed Oct. 24, 1963 2 Sheets-Sheet 1

INVENTOR
HANS HEYMANN
BY: Toulmin & Toulmin
ATTORNEYS

INVENTOR
HANS HEYMANN
BY: Toulmin & Toulmin
ATTORNEYS

United States Patent Office 3,336,579
Patented Aug. 15, 1967

3,336,579

TESTING APPARATUS FOR INFORMATION STORAGE DEVICES OF DATA PROCESSING SYSTEMS

Hans Heymann, Wilhelmshaven, Germany, assignor to Olympia Werke AG, Wilhelmshaven, Germany
Filed Oct. 24, 1963, Ser. No. 318,544
Claims priority, application Germany, Dec. 8, 1962, O 9,121
9 Claims. (Cl. 340—172.5)

The present invention relates to a testing apparatus and device for detecting faulty circuit elements or faulty circuit connections in a storage device pertaining to a data processing system, such as a matrix, particularly one of the type operating with inhibition and having magnetic cores as storage elements.

Fault detection for data processing systems of such kind usually use a testing word which is being read-in and read-out again and the read-out word is being compared with the read-in word. Devices known to carry out such testing usually test one storage location at a time, which is a cumbersome procedure when the storage device has many storage places.

It is an object of the present invention to provide an apparatus and device permitting the testing of operativeness of a storage matrix having any number of storage places, whereby it is presumed:

(1) That the storage matrix is provided with means for successively calling on all storage places, including a clock pulse source controlling the calling process;

(2) That there can be derived from this matrix a calling completed signal, furnishable regardless whether the matrix was called on for information read-in or information read-out, and (3) That there are individual read-in (inhibiting) channels and individual read-out channels such as wires traversing appropriately the several storage locations for operative connection therewith.

It is a further object of the present invention to provide a testing device capable of cyclically testing all storage places at a speed similar to that with which the storage device is operated normally.

According to one aspect of the present invention in a preferred embodiment thereof, it is suggested to provide a reversing switch having two output terminals and operating in such a manner that an input signal (a) reverses the switching position; and (b) is being passed on into the output terminal now activated due to the just initiated reversing.

The input signal of this reversing switch is furnished either by the aforementioned calling completed signal or by a frequency doubler connectable to the clock pulse source. The output terminals of the reversing switch are connected to selectively activate matrix read-in and read-out channels.

More in particular, the matrix may be provided with inhibiting wires and read-out wires selectively connectable to a register. The output terminals of the reversing switch then are being connected to individually control this latter selective connection. In this case, testing information, such as a bit or a word, may be read into the matrix, until there appears a signal at the input side of the reversing switch, whereafter this read-in information is being read-out again. If one uses the frequency doubler, then a word is being read-in and read-out again in between two clock pulses. One can further use a register into which a testing word is given first, then read into a storage place, read-out again and stored again in the register so that this read-out word is being read-in again into the next storage place etc. If no fault is present, the same word will be alternatingly read-in and read-out, i.e. after the storage places have been called upon, and there still is the same work in the register, there is no fault.

Another advantageous provision is to be seen in the usage of another reversing switch controlled by the aforementioned reversing switch in that first testing is had with one word, and then another testing cycle is had with the complementary word. This way it is ensured that those faults will be detected which have a directional component, for example, faults effective only in one direction of storage core magnetization etc.

A further attachment provides "and" circuits having adjustably biased inputs so that for a particular word a coincidence output is produced. When testing of each storage location is had with that one word, a fault will be detected by lack of coincidence. This attachment may be adapted for use of testing with a word and the word complementary thereto.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

FIGURE 1 illustrates a wiring diagram of a core matrix with read-in, read-out and call network and a testing device connected thereto;

FIGURE 1*a* illustrates a detailed portion of the wiring diagram of FIG. 1;

Figure 1:
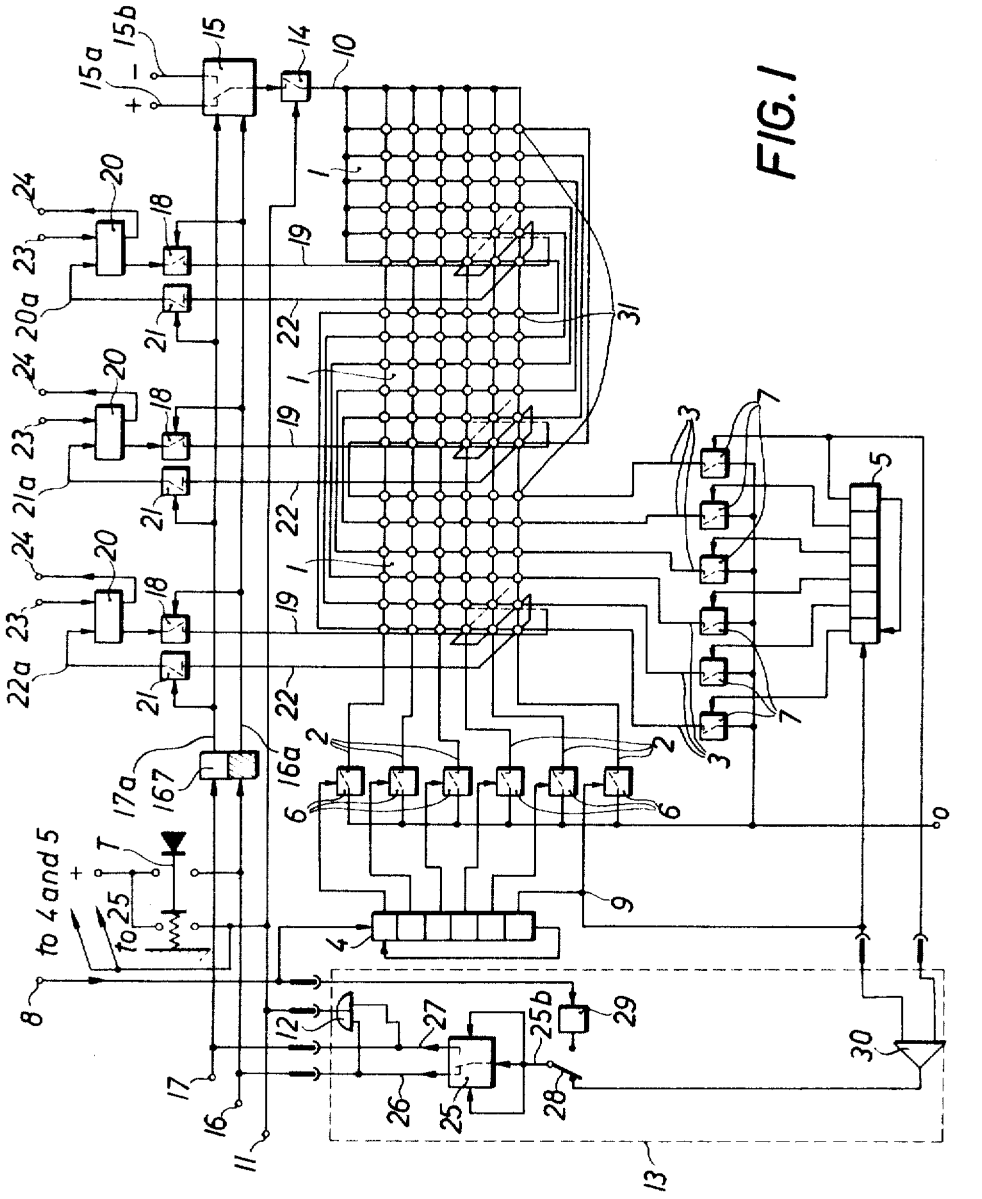

Proceeding now to the detailed description of the drawing, in FIG. 1 there is shown a storage array comprising three switch core matrices 1 each having six lines and six columns, i.e. thirty-six cores.

There are altogether six line wires 2 and six column wires 3. Each such wire pertains to all three matrices so that for any one line wire and any one column wire there are three intersections with one core for each such intersection. Since energization of one column wire and one line wire affects three storage cores, these three cores together form a single storage location for a single word which includes three bits.

Line and column wires are being called on by shift registers 4 and 5, respectively. Each shift register has six stages, one for each wire.

Each stage of each shift register 4 and 5 governs a switch or relay, there being six line wire control switches 6 and six column wire control switches 7. Each such switch when energized connects the associated wire (line or column) to zero potential terminal O. Switches 6 and 7 are of the type of remaining energized as long as the respective shift register stage is in "on" state.

The line wires and column wires have a common terminal wire or call circuit supply wire 10 connected in a manner to be described below.

The two shift registers 4 and 5 are operatively interconnected to constitute a frequency divider. In particular, shift register 4 is connected to an output terminal 8 of a source of clock pulses so that each clock pulse shifts the register from stage to stage. Shift register 4 is further interconnected to operate as ring counter with each six succeeding clock pulses defining one cycle. The last stage of shift register 4 is being actuated once every six clock pulses and it functions as pulse source for shift register 5. Thus, there is an output terminal 9 of shift register 4 delivering this output pulse at a frequency of 1/6 of the clock pulse frequency as shifting control pulse to shift register 5.

Accordingly, during the energization of one column wire, all six line wires will be called upon successively. Then the next column wire is being called upon and again all six line wires are successively called upon etc.

Hence, after shift register 5 has completed one cycle, the entire matrix array is being called upon.

Proceeding now to the line and column wire interconnection at call circuit supply wire 10, this latter wire is governed by a switch 14. Switch 14 is illustrated as relay. It may be a pulse operated relay, but it may also be a pulse operated gating circuit capable of transmitting voltages of positive as well as negative polarity relative to the reference potential at terminal O. Switch 14 is governed by a signal applied to terminal 11 from a suitable source delivering a master command signal prior to matrix read-in or read-out. Switch 14 may also be actuated i.e. turned on by a signal derived from an "or" circuit pertaining to a testing arrangement 13 to be described below.

In any event, switch 14 governs a current path leading to call circuit supply wire 10 and coming from a read-in-out selector switch 15. Switch 15 is illustrated as reversing switch. It is possible to use here a three level "and" gate capable of distinguishing between +, 0, and − potentials. There are provided two storage matrix selection command lines 16*a* and 17*a*, respectively connected to two different output sides of a flip flop 167. Command lines 16*a* and 17*a* are connected to place read-in-out selector switch 15 in either one of two operating positions. This provision serves to individually control selection of read-in and of read-out. In particular, a command pulse in command line 16*a* places the read-in-out selector switch 15 into a position which connects a terminal 15*a* of positive voltage potential to call circuit supply wire 10 (assuming switch 14 is closed). This situation takes place for read-in. Thus, line 16*a* delivers a read-in starting and command signal to read-in-out selector switch 15 connecting same to the positive voltage so that positive voltage is applied to the line and column wires of the storage array.

Command line 17*a* receives a start-read-out command signal, placing read-in-out selector switch 15 in the alternative switching position so that a terminal 15*a* of negative voltage potential call circuit supply is applied to wire 10 for storage read-out. The potentials of terminals 15*a* and 15*b* being respectively denoted as positive and negative, are measured relative to the reference and zero potential at terminal O. It will thus be appreciated that read-in and read-out are distinguished by the direction of current flow in line wires and column wires: for read-in, current flow is from the source (15*a*) through switch 15, now in read-in position, to zero potentiol O, whereas for read-out it is the opposite. This is easily understood if one considers that the direction of current in line and column wires determines the direction of magnetization of the several wires in the storage matrices.

Read-in command line 16*a* further connects to the control input terminals of three switches 18. The switches 18 govern individually three reversing or inhibiting wires 19 traversing all cores of one matrix. Wires 19 respectively originate in stages 20 for intelligence input and output.

Accordingly, read-out command line 17*a* furnishes also three command signals for three switches 21 respectively governing three read-out wires 22; and the three read-out wires 22 terminate as input in stages 20 of the input-output register.

Figure 1A:
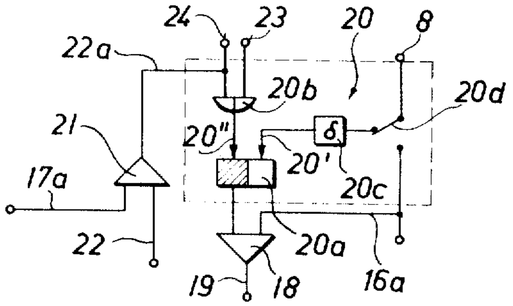

Turning briefly to FIG. 1*a*, a single register stage 20 is illustrated therein by way of a simple representative example. It comprises a flip flop 20*a* having "on" side and "off" side. There are two input terminals 20′ and 20″; terminal 20′ connects to the output of a differentiating stage 20*c* responsive to the trailing edge of an input pulse. A switch 20*d* selectively connects the input side of differentiating stage 20*c* to the clock pulse source terminal 8. This connection is being made during normal operation. The alternative connection leads to line 16*a*. Terminal 20″ connects to wire 22*a* via an "or" circuit 20*b*, having its second input terminal connected to one bit input terminal 23. The on side of flip flop 20*a* connects to the input side of an "and" gate 18 having a gating terminal connected to command line 16*a*. The output of "and" gate 18 feeds inhibition line 19. Wire 22*a* is the output line of an "and" gate 21 having its input connected to a read-out wire 22, its gating terminal connected to command line 17*a*. 18 and 22 are shown as "and" gates, but they can also be simple relay type switches. The type of elements employed (electro-mechanical or electronic) will depend on the contemplated speed with which the device is being operated. A coincidence tester can be connected to compare a permanent signal at 23 with that read-out and appearing at terminal 24.

Command lines 16*a* and 17*a* are respective output connections of a flip flop 167 operated and switched in response to command pulses occurring at terminals 16 and 17. Whenever a signal such as a pulse of short duration appears at terminal 16, the flip flop 167 will be placed into a state in which command line 16*a* is energized for delivery of a "start-read-in" command signal to switch 15 and others. A pulse at terminal 17 will reverse the flip flop 167, and now command line 17*a* will be energized for delivery of a "start-read-out" command signal. Energization of command line 16*a* interpreted as "start-read-in" command signal, closes switch 18 (or gating it open as the case may be) and placing read-in-out selector switch 15 into a position wherein terminal 15*a* connects to wire 10. Energization of command line 17*a* interpreted as "start-read-out" command signal closes switch 22 (or gating it open) and places read-in-out selector switch 15 into a position wherein terminal 15*b* connects to wire 10.

The operation of the device described thus far is briefly as follows: initially, a command signal at terminal 11 closes switch 14. Next, a "start-read-in" pulse will appear at terminal 16 placing switch 15 into a position in which a positive voltage is connected to call circuit supply wire 10. Simultaneously, the three switches 18 are closed connecting the register stages 20 to the inhibitor wires 19. A bit signal (L or O) at terminal 23 will be passed through "or" gate 20*b* and placing flip flop 20*a* in "on" state, or leaving it in "off" state as the bit may be. Gating open of gate or switch 18 in effect transmits this registered output of flip flop 20*a* to inhibition wire 19. Concurrently, the shift registers 4 and 5 call on the first storage place in synchronism with a clock pulse derived from source terminal 8 for read-in-, and the intelligence to be stored is being drawn from stages 20. Each clock pulse is also being differentiated in a differentiating stage 20*c* and the trailing edge thereof is then fed as erasing pulse to flip flop 20*a*; concurrently with the next clock pulse, a new bit may appear at terminal 23 for charge and transfer into the memory. This is conventional and needs no further elaboration. If no such erasing is desired, switch 20*d* is placed into the alternative position, which, during normal operation, remains ineffective until completion of read-in. Upon completion of read-in, line 16*a* is deactivated resulting in a trailing edge pulse, clearing all registers. Storage proper is had at coincidence of a pulse in a line wire 2, a column wire 3 and an inhibitor wire 19.

After completion of read-in, a command pulse at terminal 17 reverses flip flop 167 which in turn reverses read-in-out selector switch 15 and closes switches 21.

Now all the line and column wires also connect to the negative potential of terminal **15*b*. Again, the shift registers 4 and 5 call on all storage cores and anyone having a stored signal, induces a read-out pulse in a wire 22 accordingly. The read-out output pulses are being drawn from output terminal 24. Their effect on the flip flop is of no interest because during read-out, switch or gate 18 are in signal blocking states, also, if the trailing edge of a clock pulse is used for erasing as stated, no problem as to the state of the register 20** arises.

Since always read-in and read-out is being initiated for three wires simultaneously, there is a three bit input and output for each such read-in and read-out step. The procedure of initiating read-in and read-out is of no interest here.

Now, the testing arrangement or network 13 is to be described. This testing network is a unit having plugs for being suitably plugged in for connection with several operating wires of the network described above. The testing network may also be permanently wired to the main matrix read-in and read-out network, and there may be provided switches for establishing the necessary connections when desired.

The testing network 13 has as its central element a reversing switch 25 having output lines 26 and 27 respectively connectable to command pulse terminals 16 and 17 and the input terminals of the flip flop 167. Reversing switch 25 is of the type.

(1) In which each input signal reverses the state of connection therein, i.e., alters the activation as between two output terminals (26 or 27) and (2) In which the same input signal is being channeled into the newly activated output terminal.

Figure 4:
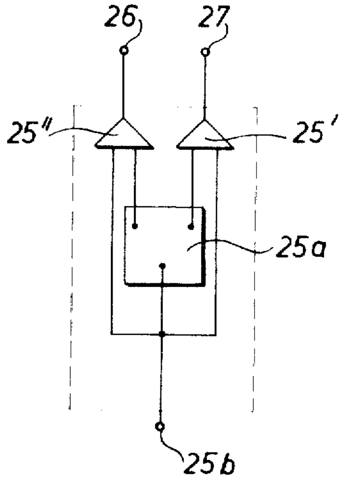
FIGURE 4 illustrates an example of a particular switch used in the testing device shown in FIG. 1.

A conceivable switch of this type constructed out of electronic components is shown in FIG. 4. There is a single input-flip-flop **25*a* having its input terminal connected to switch input terminal 25*b* and having its two alternatingly energized output terminals connected to "and" gates 25′ and 25″. Each "and" gate 25′ and 25″ also has a second input terminal connected to the common pulse input terminal 25*b***. Other types of switches are conceivable.

Turning back to FIG. 1, the connection of terminals 26 and 27 to flip flop 167 serves to enable testing and reversing switch 25 to actuate and control the read-in-out selector switch 15.

A manually operated switch 28 governs the input line **25*b* for reversing switch 25, i.e. the output lines or terminals 26 and 27 will selectively be connected, operatively be the reversing switch 25 to manually operated switch 28. Switch 28 has two input terminals, one connects to the output terminal of an "and" circuit 30. The "and" circuit 30 has two input terminals, one being connected to output terminal 9 of shift register 4, the other one being connected to the output terminal of shift register 5. In effect, "and" circuit 30 responds whenever the last storage place 31** is being called upon and furnishes a "storage-calling-completed" signal. This latter signal will appear regardless whether the storage device was being called on for read-in or for read-out.

The other input terminal of switch 28 connects to the output side of a frequency doubler 29 to which are applied the clock pulses from source 8.

Hence, switch 28 can connect to the reversing switch 25 either a pulse train source of twice the clock pulse frequency or a signal indicative of completion of matrix calling.

The output terminals 26 and 27 further connect to an "or" circuit 12 which, in turn, connects to the master command line 11 governing the switch 14. This latter connection responds regardless of the particular position of reversing switch 25. Since there always will be a command pulse for read-in-out switch 15, any signal leaving switch 25 during testing will ensure that switch 14 is closed indeed.

There is further provided a testing switch T which is manually operated spring biased push button switch capable of supplying briefly a "start testing" command pulse to both lines 11 and **16*a* so as to close switch 14 and place read-in-out selector switch 15** into the read-in position.

There may be further provided conventional means to place the entire circuit into zero position prior to testing such as an erasure of any arbitrary shifting pulse in registers 4 and 5. There may also be provided means for indicating the position of switch 25 and start-testing switch T may be connected with a further contact, briefly applying a trigger pulse to switch 25 so as to place same into a position or state which is in synchronism with the position or state of switch 25. Indicator lamps may be provided to indicate the state of energization and of switching positions.

It should be mentioned that the following modifications are within the scope of the invention without requiring detailed description. The output terminals of elements 29 and 30 may directly be connected to the input terminal **25*a* of switch 25. This connection may possibly include a logic "or" circuit. Also, frequency doubler 29 can be dispensed with if the network at large, i.e. the data processing system to which this storage device pertains, already includes a source furnishing a train of clock pulses of twice the frequency of those at source 8**.

Testing is carried out as follows: it may be assumed that manual switch 28 is in the illustrated position connecting the output of "and" circuit 30 to input line **25*a*. It may further be assumed that switches 15 and 25 are in the illustrated position, that is to say, the matrix is prepared for read-in, and "and" circuit 30 is connected to command line 16. As stated above, these positions may be attained by pressing the start-testing switch T. Switches 20*d* connect the eraser circuit for flip flop 20*a* to line 16*a***.

The clock pulse source 8 now shifts the register 4 so that successively all lines 2 are being connected in between zero line O and the positive voltage. The calling on all of the matrix cores follows as described above. For testing, a three position binary coded number is being placed in register stages 20 by applying proper pulses to terminals 23 effective as three bit word in the three inhibitor wires 19; this word is being stored in all storage places.

Upon calling on place 31, an output pulse appears simultaneously at the two inputs of "and" circuit 30, the coincidence output of which is the storage calling completed pulse which is delivered through switch 28 to the input terminal **25*a*. This pulse (1) Causes switch 25 to reverse, (2) Is being passed on by the reversed switch into a start-read-out command line 17*a* so as to reverse the position of read-in-out selector switch 15 to the read-out position, wherein the negative potential is applied to call circuit supply wire 10**;

(3) Upon deactivation of line **16*a*, the register 20** is being reset or erased.

Since not only shift register 4 but also shift register 5 is connected as ring counter, after the last calling for read-in, the next following clock pulse will in fact appear as call pulse for read-out, switch 15 having been reversed in between the two clock pulses and in a manner as stated (i.e. via testing network 13 as afore-described). Accordingly, the word previously read-in into all storage places is now being read-out and passes as read-out bit pulses through read-out wires 22, switches 21, through register 20, and into output terminal 24.

It should be mentioned that output terminal 24 could also connect to the on-side-output of flip flop **20*a* in which case during the read-out period switch 20*d* has to connect to clock pulse source terminal 8** so that the register is charged with each read-out word, which is being erased promptly.

A bit indicator such as a lamp may be connected to terminal 24 to check and indicate whether for each read-in bit there is the correct read-out bit.

Any missing read-out bit L (if there should be one) is detected by such lamp.

If a particular word position is to have the bit O as one bit within the test word, the corresponding flip flop 20*a* should not be switched during read-in nor during read-out. Any switching then is an error bit, and will also be indicated.

Upon completion of read-out of the entire storage device, again there is coincidence at "and" circuit 30 by virtue of two outputs, respectively at the ends of shift registers 4 and 5. The coincidence again results in "calling completed" pulse at circuit 30 and is passed on through switch 28 to terminal 25*a* causing a reversing of the switch 25, whereby a "start-read-in" command pulse appears at line 16*a* to place read-in-out selector switch 15 again into the read-in position.

Prior to a next following carrying out of this read-in command, care has to be taken that the read-out just completed represented in fact correctly the read-in intelligence and that any error be corrected.

The mode of testing described thus far checks errors by comparing the initially read-in information with the read-out information with the read-out cycle promptly following the read-in cycle described. Errors may result from any sources, such as defective or broken down circuit elements, loose wires etc. Errors may be indicated by signal lamps appropriately connected to the register.

Theoretically, it is possible that an error is balanced by a complementary error in all cores of a particular storage location thus simulating correctness. This case, however, is extremely unlikely and the probability is reduced with increased number of cores for storage place. For testing in accordance with the mode as described (switch 28 in illustrated position), it may be desirable to not merely read-in one and the same testing word, but also and alternatingly the complementary word. This will be explained more fully in connection with FIGS. 2 and 3.

Figures 2, 3:
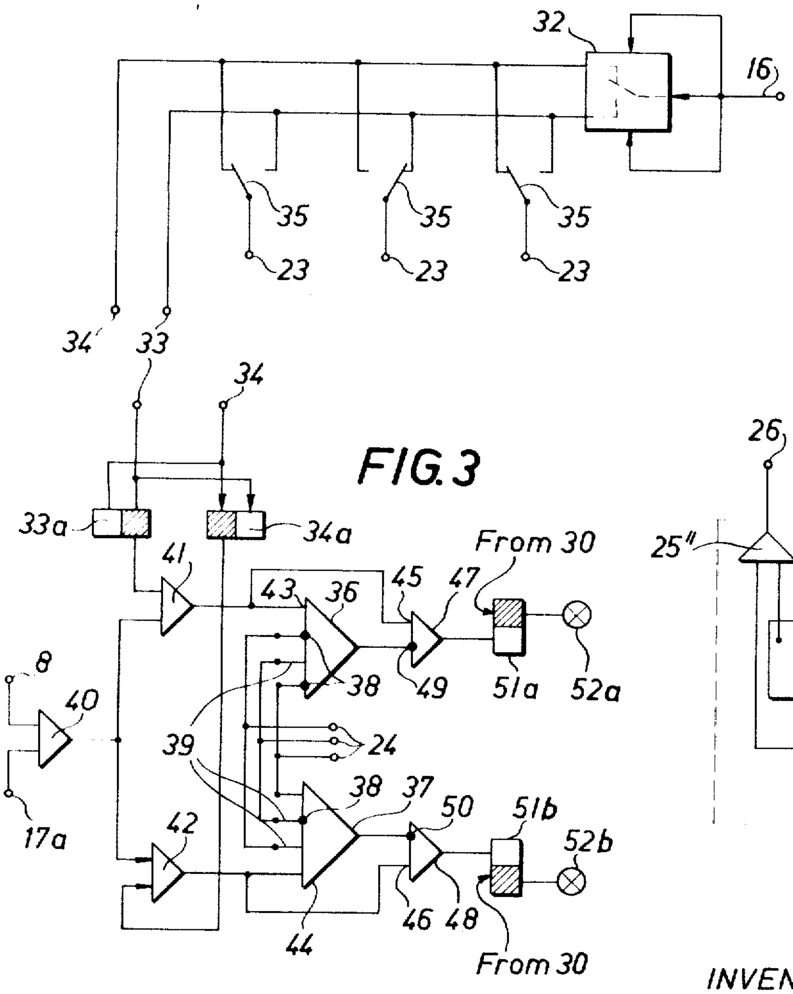
FIGURE 2 illustrates a wiring diagram source for a testing word providing also for the complementary word.
FIGURE 3 illustrates an indicating attachment to be used in connection with the testing device of FIG. 1, possibly also in connection with that of FIG. 2.

FIGURE 2 illustrates a pulse source with which this type of testing can be carried out. The network shown in FIG. 2 does not only form a complementary signal for such double read-in, but also it corrects the input at the beginning of the read-in cycle. This is necessary since the mode of testing under consideration includes always all storage places nad since a repetition of read-in i.e. the maintaining of an existing error could only permit conclusions as to the last storage place which is insufficient for some purposes.

In FIGURE 2 there is shown a pulse source constituted by a bistable switching element 32 having two complementary output terminals 33 and 34. The switching element 32 can be of similar type as shown in FIG. 4. A manually operable set of switches 35 selectively connects the intelligence input terminals 23 of the stages 20 (see FIG. 1) to either one of these output terminals 33 and 34. For any position or state of switching element 32, one can always apply either L or O to terminals 23, and upon reversal of either switch 32 or 35, the complement of the initial signal can be established and applied to terminal 23.

As shown in FIG. 2, the input of switch 32 is connected to the "start-read-in" command pulse terminal 16 so that any pulse in this line (1) Reverses the switching state of switch 32;

(2) Is passed on into the newly established connection to either line 33 or 34.

It will be observed that here the "start-read-in" command pulse is itself being used for the formation of the test word. The device shown in FIG. 2 can be combined physically with the testing unit 13 of FIG. 1 so that when a testing procedure is desired, the testing network as a whole is connetced into the circuit while otherwise the input terminals 23 connect only to a source of intelligence in the data processing system to which the storage device pertains.

Accordingly, there first is a read-in and read-out cycle passed through completely for testing. Then a pulse at the output side of "and" circuit 30 appears at terminal 26 and then in line 16 and not only prepares the network for a new read-in, but also reverses switch 32 so that the new read-in and read-out cycle is had with the complementary word.

Proceeding now to the description of FIG. 3, there is shown an indicating network which is made responsive to particular errors individually occurring when read-in and read-out is had in a manner which includes all of the storage locations.

In FIGURE 3 there are two "and" circuits 36 and 37. "And" gate 36 has one direct input 39 and two inverted inputs 38, whereas "and" circuit 37 has one inverted input 38 joined to the one direct input of "and" circuit 36, which two direct inputs of "and" circuit 37 are individually connected to the two inverted inputs of "and" circuit 36. The thus established three input lines connect to the intelligence read-out terminals 24 of FIG. 1 and pertain to the three aforedescribed register stages 20.

It will be observed that the inputs of "and" circuits 36 and 37 correspond to the testing signal or number as adjusted by switches 35 in FIG. 2. Thus, whenever the testing signal is being read-out, for example, as LOL, or as complementary signal OLO, one of the "and" circuits 36 and 37 will respond with an LLL coincidence at its three main input terminals. Complete coincidence, of course, in any of the "and" circuits 36 and 37 will occur only when the respective fourth input receives a gating signal.

The gating terminals 43 and 44 of "and" circuits 36 and 37, respectively, connect to the output side of switches 41 and 42. There is a common input for the two switches derived from an "and" circuit 40 and connected to the clock pulse source 8 and to the read-out-command line 17*a*. Switches 41 and 42 are designed as "and" gates receiving gating signals from flip flops 33*a* and 34*a*. Flip flop 33*a* is connected for being turned on by a pulse from line 33 (see FIG. 2), while the same pulse turns flip flop 34*a* off. Conversely, flip flop 34*a* is connected for being turned on by a pulse derived from line 34, while the same pulse turns flip flop 33*a* off. Flip flops 33*a* and 34*a* when being turned on (alternatingly) gate-open "and" gates 41 and 42, respectively, while a flip flop in "off" state blocks the respectively associated "and" gate 41 or 42.

Actuation of switch or "and' gate 41 or 42 is had during the beginning of any read-in cycle whereby it is being decided by appropriate position of switch 32 (FIG. 2) whether signal LOL or OLO is to be passed for read-in through terminals 23 into the registers 20 (FIG. 1). The corresponding switch 41 or 42 is then being gated open, the corresponding "and' circuit 36 or 37, however, will respond only after read-out command line 17*a* opens gate 40 for passage of clock pulses which then in turn pass through either gate 41 or 42.

There are further provided two further "and" circuits 47 and 48 connected as follows: the output of "and" circuit 36 is inverted at 49 and thus constitutes one input of "and" circuit 47. The other input of "and" circuit 47 is furnished at a direct connection 45 to the output of "and" gate 41. Correspondingly, the output of "and" circuit is inverted at 50 and the thus inverted output furnishes one input signal for "and" circuit 48, whereas the second input 46 of circuit 48 is derived from the output of "and" gate 42.

Assuming that "and" gate 41 is being gated open and that the previously read-in signal for this particular cycle of read-in and read-out is OLO, then for read-out and at occurrence of a clock pulse, there will be an L signal at terminal 43 for gating open "and" circuit 36. If read-out is correct, then the same pulse combination i.e. OLO appears at terminals 24 and there will indeed be the coincidence LLLL at "and" circuit 36, correspondingly furnishing an output L. However, at 49 this latter output is inverted so that the input (45, 49) of "and" circuit 47 now is (L, O) which means that no output leaves "and" circuit 47.

Assuming that read-out was not correct, then the output of "and" circuit 36 is O so that now a coincidence L, L stands at the two inputs of "and" circuit 47, and a flip flop 51*a* responds, turning "off" (or "on" as desired) a signalling lamp 52*a* as indication that an error occurred.

Flip flop 51*a* will not respond as long as during that particular testing cycle the word OLO is being read-out correctly.

After completion of this particular testing cycle and as was explained above, a pulse in line 16 reverses switch 32 so that now "and" gate 42 is being gated open while 41 is blocked. As long as there is now read-in of the complementary word LOL, nothing occurs in the network of FIG. 3, since there will be no signal at lines 24 and "and" gate 40 is blocked. At this point it should be mentioned that "and" gate 40 may be dispensed with so that the clock pulses will be applied always directly to "and" gates 41 and 42. Since during read-in already one of these latter gates is open, the clock pulse appears at terminals 45 or 46. During read-in, of course, both "and" circuits 36 and 37 furnish the output O so that at both inversion terminals 49 and 50 there will be an L signal. Accordingly, one of the flip flops responds already which is indicative that a portion of the circuit network carries out read-in properly.

One could also connect the two "and" gates 41 and 42 to call circuit supply wire 10 and at such polarity that the current pulses during read-in remain ineffective, whereas the opposite call pulses during the read-out furnish signals to be passed through either gate 41 or gate 42.

Proceeding now with the description of the complementary word read-out, as soon as read-out starts, the proper signal to be read-out for each read-out step is LOL. This will result in an LLLL coincidence at "and" circuit 37 and an O signal at inverter output 50, so that in spite of an L signal at 46, the "and" circuit 48 has no output and a flip flop 51*b* connected thereto does not respond and lamp 52*a*, for example, is on. If an error results in a read-out signal so that with the correspondingly occurring clock pulse at 46 "and" circuit 48 will respond, flip flop 51*b* will be actuated resulting in a turning "off" of lamp signalling 52*b*. Since flip flops 51*a* and 51*b* are bistable elements, the error indication stands on regardless of further combination of testing and regardless whether no further error occurs. Erasure of flip flops 51*a* and 51*b* can, for example, be provided by connecting the turning "off" control sides to "and" gate 30 (FIG. 1) so that the initial state is always resumed after completion of a storage device call cycle.

A double testing cycle with a device including FIGS. 1, 2 and 3 will now be carried out as follows:

Again, position of the switches 15 and 25 is assumed to be as illustrated. At first, pulse in line 11 closes switch 14 and reaches the line and column wires of the matrices for read-in, there being positive potential applied to call circuit supply wire 10.

Testing switch T is being temporarily closed to ensure that indeed the switches 15 and 25 have or assume the illustrated position, switches (or gates) 18 close (or are being gated open) to operatively connect inhibitor lines 19 to registers 20.

Correspondingly, switch 32 is being placed thereby in any position, it is immaterial which one, and a signal (word), for example, LOL appears at the three terminals 23 charging the register 20 accordingly.

There may, for example, be connected to the testing switch a means placing shift registers 4 and 5 into initial state so that concurrently therewith or with the next clock pulse this word will be read-in to the first storage place. Still upon briefly closing of testing switch T, the resulting pulse causes "and" gate 41 to respond, connecting "and" gate 40 to inputs 43 and 45 of "and" circuits 36 and 47 respectively.

This word LOL is now being read into all storage places at clock pulse rate as described above. Completion of read-in is indicated by a coincidence output pulse at "and" circuit 30 causing switches 35 and 15 to reverse their position and read-out takes place immediately thereafter, eventually, lamps, flip flops 51*a* and 51*b* are turned into "off" state. The read-out word appears at terminals 24 and are applied at clock pulse rate to "and" circuit 36, and as long as LOL is being read-out, the inverter output at terminal 49 is O so that flip flop 51*a* does not respond. If an error occurs, the output of "and" circuit 36 is O, that of 49 is L and flip flop 51*a* does respond for appropriate signalling.

Upon completion of read-out, again "and" circuit 30 responds and reverses both switches 15 and 25 to establish again read-in operating positions. Thereby, the resulting pulse in line 16 reverses switch 32 and now the word OLO appears to read-in at terminals 23, the register is being charged accordingly. Also, this "start-read-in" signal appears in line 34 for gating open gate 42, preparing terminals 44 and 46 for later read-out of the word OLO. After completion of read-in of word OLO, again the output of "and" gate 30 reverse switches 25 and 15, and read-out commences. As long as the word OLO is properly being read-out and with each read-out step at clock pulse rate there is an LLLL coincidence at the input of "and" circuit 37 so that an input, O, L prevails at "and" circuit 48. An error in the read-out signal results in an output of "and" circuit 48 to switch flip flop 51*b* and signalling occurs.

The next second mode of testing requires change-over of switch 28 to connect frequency doubler to the input 25*a* of reversing switch 25. The thus switched network operates as follows: it shall be assumed that a three bit word is applied to terminals 23 as short bit pulses charging, for example, flip flops 20*a*, and thereafter no further signal appears in terminals 23.

Assuming again that shift registers 4 and 5 are in a state to call on the first matrix storage place, then the intelligence momentarily present in registers 20 will be read into this first storage place. (It is again assumed that switches 15 and 25 have the illustrated position.) After this clock pulse has caused read-in for the first matrix storage place, and prior to the next clock pulse, there will be a pulse frequency doubler 29 causing switches 25 and 15 to reverse their respective positions to now assume read-out position. Assuming that the shift registers 4 and 5 are bistable elements, they keep calling on the first matrix storage location until the next clock pulse from 8. Thus, the first frequency-doubling pulse as occurring in between two clock pulses places the network into read-out position, enabling in particular lines 17 and 17*a*. The corresponding decay of activation of line 16*a* is also differentiated by stage 20*c* and fed as eraser pulse into the stages 20 for turning those "off" which had stored a bit-L. Activation of the read-out circuitry finds the first storage place still being called upon, but now for read-out, and the just read-in signal is being read-out again immediately succeeding read-in.

This read-out pulse for each bit channel is fed also to "or" circuit 20*b*, and if the bit is an L signal, it is being used to again switch flip flop 20*a* into storing signal position.

It thus appears that the previously read-out signal is being used to recharge the register 20.

The next clock pulse at source 8 initiates the following:

(1) Register 4 is shifted to the second line and the next storage place is called on, still in the first column;

(2) A frequency double pulse passes into switch 25 and reverses same so that a pulse is passed into lines 16 and 16*a*;

(3) Switch 15 is changed over for read-in;

(4) Switches 18 are closed (or gate 18 is enabled);

(5) The signal then at registers 20 is being read into the second storage place by permitting passage through elements 18.

While this second storage place is still being called upon by the shift registers 4 and 5, and prior to the next clock pulse from 8, a frequency doubler pulse from 29 reverses the network for read-out again, and the second storage place is being read-out again, and the read-out pulses are being stored again in register 20.

It is apparent that this read-in and read-out for each storage place and at the occurrence of each clock pulse continues. Since both the registers 4 and 5 operate as ring counters, and since "and" circuit 30 is ineffective at this mode of testing, the testing with read-in and read-out for one clock pulse period is continued indefinitely. Any fault in the system will appear in a change of the word being read-in and out again. After a while there will be no change in the intelligence appearing at the register 20; there was a continuous adding up of errors, but there will result a residual error which does not change after all storage places have been called on for read-in and read-out as stated. Such residual error is then readily detectable, for example, with the aid of lamps.

The invention is not limited to the embodiments described above, but all changes and modifications thereof not constituting departures from the spirit and scope of the invention are intended to be covered by the following claims:

What is claimed is:

1. A testing device for detecting faults in a storage matrix having a plurality of storage positions, each capable of storing a binary bit, said testing device comprising, in combination:

(a) supply means for supplying a first series of pulses at a selected first repetition rate and for supplying a second series of pulses at a preselected second repetition rate;

(b) input means for supplying a test word to be written into and read out from said storage positions of said matrix;

(c) control means responsive to said series of pulses and operable between a first position wherein a bit of said test word is written into each of said storage positions at a rate related to said first repetition rate of said series of pulses and a second position wherein said bit is read out from each of said storage positions at a rate related to said second repetition rate;

(d) comparing means for comparing each bit read out from each of said storage positions with the bit of said test word read into said respective position; and (e) means for indicating a fault in a storage position whenever the bit read out from said storage position does not correspond to the bit of said test word previously written into said storage position.

2. A testing device in accordance with claim 1 wherein said control means is in said first position and a bit of said test word is read into each of said storage positions of said matrix and including means for switching said control means into its second position when a bit is written into the last of said storage positions of said matrix.

3. A testing device in accordance with claim 2 wherein said storage positions are arranged in columns and rows, and including a row shift register and a column shift register for enabling a bit to be written into and read out from any one of said storage positions determined by the activated stages of said shift registers, the last stage of said row shift register being connected to the first stage of said column shift register, an "and" gate having inputs connected to the last stage of each of said row and said column shift registers whereby the coincidence of outputs from both of said shift registers produces an output signal from said "and" gate, and switching means responsive to said output signal of said "and" gate for switching said control means from said first position to said second position thereof.

4. A testing device for detecting faults in a storage matrix having a plurality of storage positions, each capable of storing a binary bit, said testing device comprising, in combination:

(a) supply means for supplying a first series of pulses at a selected first repetition rate;

(b) means responsive to said first series of pulses and producing a second series of pulses occurring at a second repetition rate substantially double said first repetition rate;

(c) input means for supplying a test word to be written into and read out from said storage positions of said matrix;

(d) control means responsive to said series of pulses and operable between a first position wherein a bit of said test word is written into each of said storage positions at a rate related to said first repetition rate of said series of pulses and a second position wherein said bit is read out from each of said storage positions at a rate related to said second repetition rate;

(e) switching means responsive to said second series of pulses for switching said control means between its first and second positions and vice versa, whereby a bit of said test word is written into one of said storage positions upon the occurrence of a pulse from said first series of pulses and is read out from said storage position before the occurrence of the next successive pulse of said first series of pulses;

(f) comparing means for comparing each bit read out from each of said storage positions with the bit of said test word read into said respective position; and (g) means for indicating a fault in a storage position whenever the bit read out from said storage position does not correspond to the bit of said test word previously written into said storage position.

5. A testing device in accordance with claim 4 wherein said input means supplies bits of a first test word and wherein said input means is responsive to the bits read out from each of said storage positions for supplying said read out bits as the test word for the next successive storage position to be tested.

6. A testing device in accordance with claim 1 wherein said input means supplies a first test word having a plurality of first bits and supplies a second test word having a plurality of second bits, each of said plurality of second bits respectively being the complement of each of said plurality of said first bits whereby each of said storage positions of said matrix can be checked for errors in storing both said first type of bits and the complements of said first type.

7. A testing device in accordance with claim 1 wherein said input means first supplies a test word having bits corresponding to the binary 0 and after said test word is written into and read out from each of said storage positions of said matrix, said input means supplies a test word having bits corresponding to the binary 1.

8. A testing device in accordance with claim 3 wherein said "and" gate and said switching means are connected as a separate integral unit which may be disconnected from said control means without affecting the normal storage operation of said control means and said storage matrix after said testing has been completed.

9. A testing device in accordance with claim 1 including means for producing a read-out signal when said bits are being read out from said storage positions, said comparing means includes an "and" gate responsive to said bits of said test word and to the bits read out from each of said storage positions of said matrix and produces an output signal when said bits of said test word and said read-out bits correspond, and wherein said indicating means indicates a fault whenever an output signal from said "and" gate is not produced during the occurrence of a read-out signal.

References Cited

UNITED STATES PATENTS

| | | | |
|---|---|---|---|
| 2,242,196 | 5/1941 | Thompson et al. | 178—69 |
| 3,031,650 | 4/1962 | Koerner | 340—174 |
| 3,049,692 | 8/1962 | Hunt | 340—146.1 |
| 3,222,645 | 12/1965 | Davis | 340—146.2 |

ROBERT C. BAILEY, *Primary Examiner.*

R. RICKERT, M. LISS, *Assistant Examiners.*